Aug. 2, 1949.   N. H. SANDBERG   2,477,830
STACKING CONVEYER
Filed Aug. 3, 1945   4 Sheets-Sheet 3
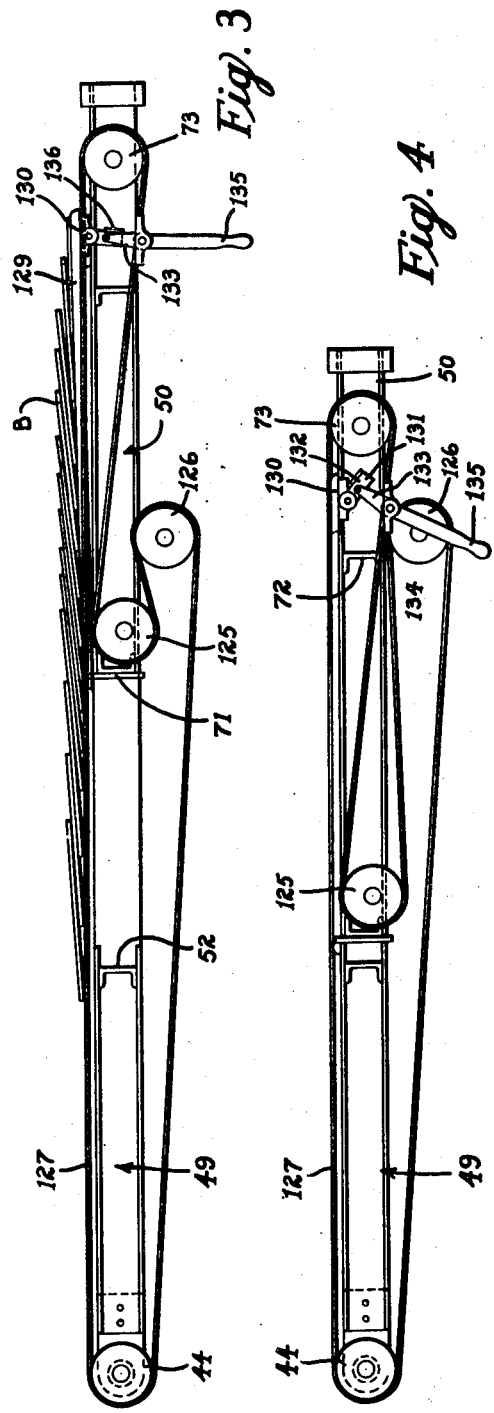
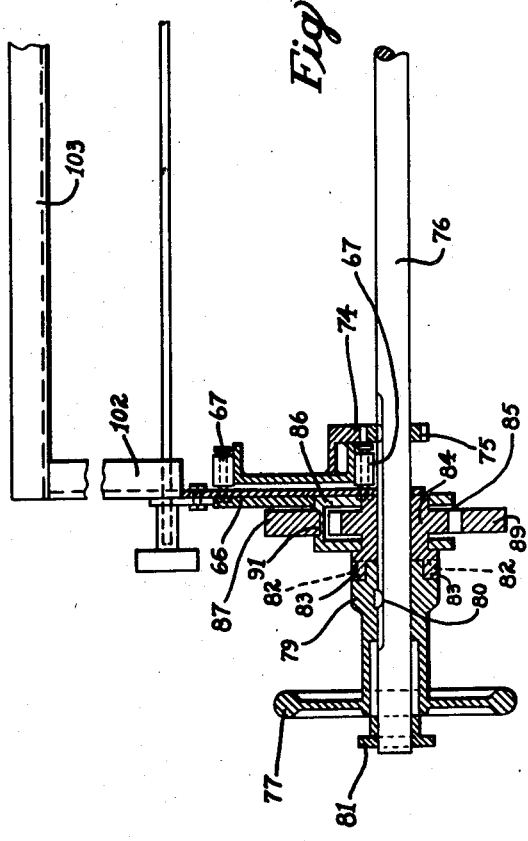
Inventor
Nels H. Sandberg
By Robert M. Dunning
Attorney

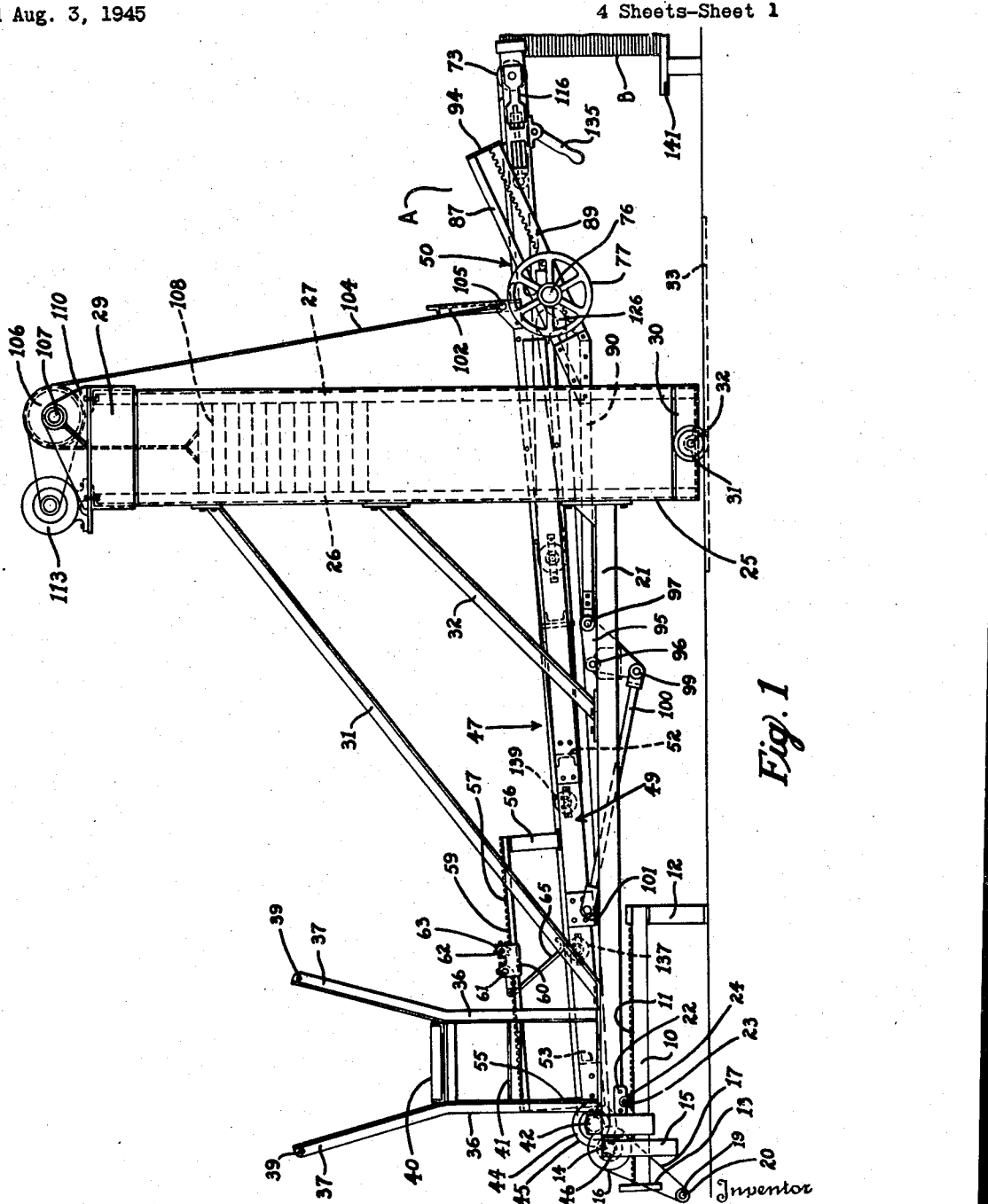

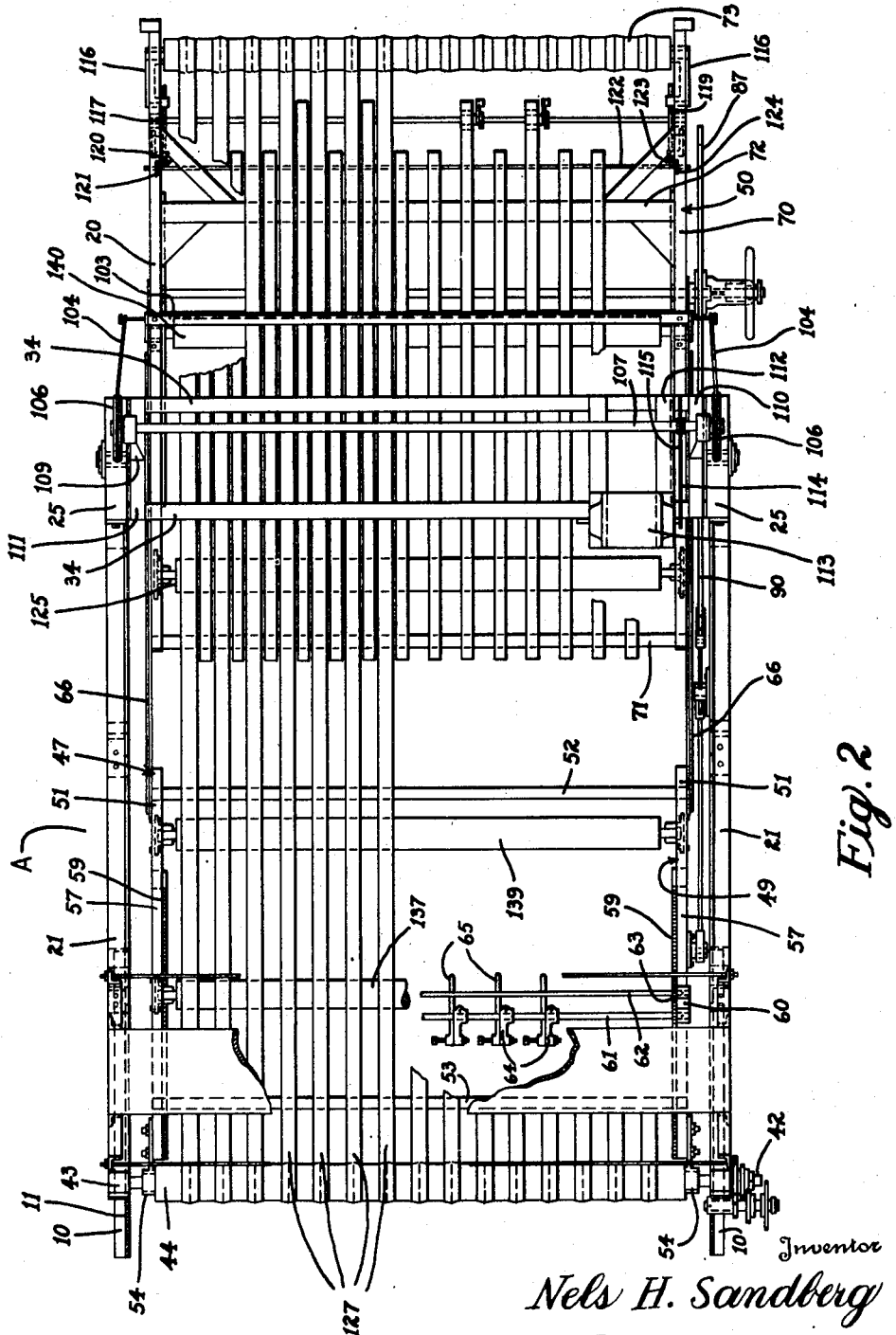

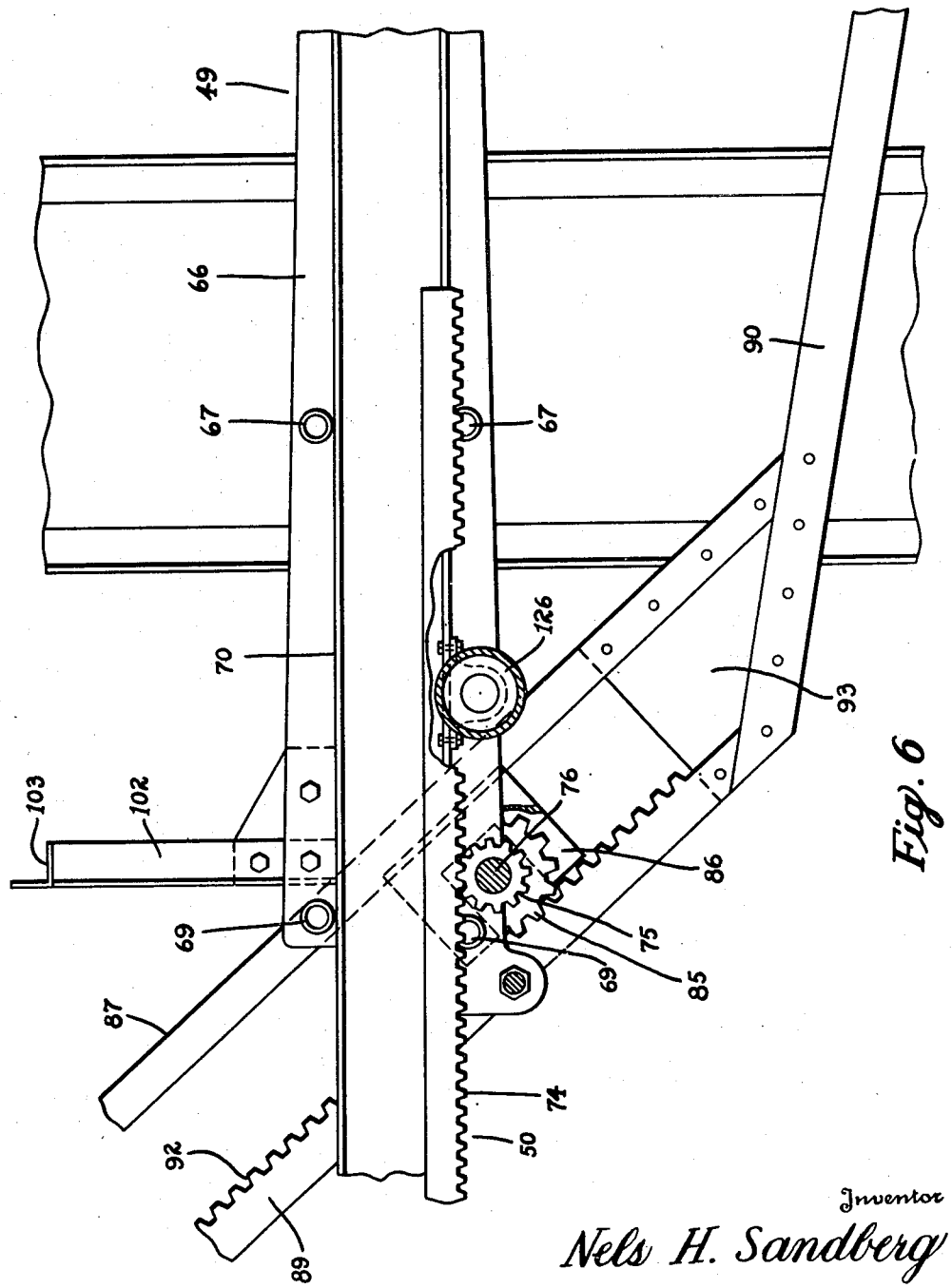

Patented Aug. 2, 1949

2,477,830

UNITED STATES PATENT OFFICE 2,477,830

STACKING CONVEYER

Nels H. Sandberg, Minneapolis, Minn., assignor to Waldorf Paper Products Company, St. Paul, Minn., a corporation of Minnesota Application August 3, 1945, Serial No. 608,669

13 Claims. (Cl. 271—68)

My invention relates to an improvement in stacking conveyors, wherein it is desired to provide a conveyor which will stack flat sheets or the like in a vertical pile.

In the forming and printing of sheet material, it is common practice to deliver the sheet material onto a conveyor from which the sheets may be manually removed and stacked. For example in the forming of containers made of corrugated board, fiber or the like, the large blanks are delivered to a belt conveyor which carries the blanks onto a stationary platform or stationary portion of the conveyor. These blanks are produced at a high rate of speed, making it necessary in many instances for two workmen to continuously remove the blanks from the stationary platform and pile them on a loading platform or truck. Due to the speed at which the blanks are delivered, it is necessary to employ a third workman to remove the stacked blanks and to place an empty loading platform in proper position at frequent intervals. In the absence of such a third workman, it is necessary to stop the machine until an empty loading platform has replaced the loaded platform. The work of removing and stacking the blanks is tedious and hard due to the regularity with which the blanks are delivered. In many instances, it is even necessary to stop the forming operation during the replacing of the loading platforms, due to the fact that an excessive number of blanks will accumulate during the changing operation.

It is the object of the present invention to provide a conveyor which is pivotally mounted so that the delivery end thereof may be raised and lowered. The blanks may then be dropped onto the loading platform directly from the end of the conveyor and the conveyor may then move upwardly as the pile grows in height so as to permit the blanks to drop properly into place regardless of the height of the stack.

It is an added object of the present invention to provide a stacking conveyor which is equipped with means for changing the length of the conveyor as the delivery end thereof is raised. The receiving end of the conveyor must be maintained at substantially constant height to receive the blanks from the forming or printing apparatus. Therefore as the delivery end is raised and lowered the lateral distance between the ends of the conveyor would change unless the conveyor was adjusted in length. In order that the pile may be vertical, I provide means of adjusting the length of the conveyor so that the lateral distance between the ends of the conveyor may remain constant regardless of the inclination of the conveyor.

A further feature of the present invention resides in providing a means for automatically varying the length of the conveyor as the delivery end thereof is raised or lowered. Thus in order to produce a vertical stack it is only necessary to raise the delivery end of the conveyor as the stack increases in height.

A further feature of the present invention lies in the provision of a means for manually adjusting the length of the conveyor so that a plurality of stacks of blanks may be piled on a loading platform without moving the platform. In most instances it is desired to pile two or three stacks of blanks on a single platform. The loading platform is inserted in place, the first stack completed and the conveyor lowered and shortened to permit a second pile of blanks to be stacked next to the first.

An added feature of the present invention lies in the provision of mechanical means for raising and lowering the delivery end of the conveyor. In order to simplify the operation the weight of the conveyor is preferably counter-balanced and a motor is provided for raising or lowering the conveyor end. This motor is preferably controlled by a suitable conveniently positioned push button switch mechanism so that the conveyor may be elevated and lowered quickly.

An added feature of the present invention lies in the provision of a conveyor equipped with means for supporting the blanks above the level of the conveyor during lowering of the conveyor or during the replacement of the loading platform. The conveyor comprises a series of spaced belts on which the blanks are carried. Between the belts I provide means which may be elevated slightly above the level of the belts. Thus as the blanks are carried by the conveyor they are pushed onto the raised members between the belts in such a way that the blanks may pile up above the conveyor during the lowering of the conveyor delivery end.

These and other objects and novel features of my invention will be more clearly and fully set forth in the following specification and claims.

In the drawings forming a part of my specification:

Figure 1 is a side elevational view of my stacking conveyor showing the construction thereof.

Figure 2 is a top plan view of the stacking conveyor illustrated in Figure 1.

Figure 3 is a diagrammatic side view showing the conveyor belt arrangement with the conveyor extended and the blanks piling up upon the same.

Figure 4 is a diagrammatic view similar to Figure 3 showing the conveyor in shortened condition.

Figure 5 is a sectional view through a detail portion of the construction.

Figure 6 is a sectional view of a portion of the conveyor frame.

The stacking conveyor A, illustrated in the drawings, is designed for use with an apparatus such as a printing press, blank forming mechanism, or any other apparatus discharging sheets, or the like, which are to be stacked one upon the other. This apparatus is not shown in the drawings due to the numerous types of devices on which the conveyor may be used. In order that the apparatus with which the stacking conveyor is employed may be readily accessible, the entire stacking conveyor is movably mounted so that it may be moved away from the apparatus with which it is used.

A pair of horizontal supporting rails 10 having a toothed upper surface 11 are supported at one end by a supporting post 12 and at the other end 13, the rails are connected to the printing press or other apparatus. A transverse shaft 14 is supported by a stationary bearing 15 and acts to support a sprocket 16. The sprocket 16 is connected by a chain 17 to a sprocket 19 on the drive shaft 20 which is connected to any suitable source of power supply. The shaft 20 may be connected to the printing press of other mechanism to which the conveyor A is attached, or may be driven by a separate power supply such as a motor or the like.

A pair of horizontal supporting frame members 21 are equipped with bearings 22 thereupon in opposed relation. The frame members 21 extend in parallel relationship on opposite sides of the conveyor. A shaft 23 extends through the bearings 22, this shaft extending from one side of the conveyor to the other. Pinions 24 are supported on the shaft 23 to rotate therewith. Rotation of the shaft 23 acts to move the frame members 21 longitudinally along the rails 10. A squared end on the shaft 23 may be fitted with a crank if desired, or any suitable means of rotating the shaft 23 may be provided.

A substantially rectangular frame 25 is connected to the forward end of each frame member 21. Each rectangular frame 25 comprises a pair of parallel opposed channels 26 and 27 which are connected at the top and bottom by cross connecting members 29 and 30, respectively. Inclined braces 31 and 32 are attached at one end to the frame member 21 and at the other end to the upright channel 26 so as to provide rigid connecting members holding the frame portions rigidly together.

Flanged wheels or rollers 31 are pivotally connected at 32 to the cross members 30 of the upright frames 25. These rollers 31 roll on rails or in grooves 33 so as to guide the movement of the frame. Thus it will be seen that the frame supporting the conveyor may be moved toward or away from the printing press or other apparatus which it is used with, by merely rotating the shaft 23. The opposite sides of the frame are connected by transversely extending connecting members. The upper extremities of the upright frames 25 are connected by transversely extending angles 34. The lower ends of the frames 25 may be similarly connected by cross braces not illustrated. At the rear or receiving ends of the frame the sides of the frame are connected by the shaft 23 and may also, if desired, be connected by a transverse brace 35. Upright angles 36 extend upwardly from each of the frame members 21 at the inlet end of the conveyor. These uprights 36 extend parallel for a part of their height and are then bent to provide diverging upper ends 37. Hand rails 39 may extend transversely between opposite sides of the frame and a beam or plank 40 may be supported between the uprights 36 across which the operator may walk. Additional cross braces such as 41 may be provided between the uprights 36 to serve as a ladder. The walk 40 is for assistance in inspecting the printing or blank forming machine to which the conveyor is attached.

An extensible conveyor frame is pivotally supported to the frame described. A shaft 42 is supported upon suitable bearings 43 on the frame member 21. This shaft 42 supports an elongated roller 44 about which the conveyor belts of the conveyor may extend. A gear 45 is mounted on the shaft 42 to mesh with a gear 46 on the shaft 14. Thus when the frame 21 is in proper position the gears 45 and 46 mesh. The gear 46 is mounted upon the shaft 14 which is driven in the manner previously described from the drive shaft 20.

The extensible conveyor frame is illustrated in general by the numeral 47. This conveyor frame includes a pivotally mounted frame section illustrated in general by the numeral 49, and a slidable frame section illustrated in general by the numeral 50. The frame sections 49 and 50 telescope to a greater or lesser extent so as to elongate or shorten the length of the conveyor. The pivoted frame section 49 includes a pair of parallel channels 51 which are connected together by transversely extending cross members 52 and 53. Bearings 54 are attached to one end of each channel 51 to receive the shaft 42. The entire conveyor frame is pivotal about the shaft 42, the upright of the conveyor thus being movable from substantially horizontal position to elevated position.

As illustrated in Figure 1 of the drawings a pair of uprights 55 and 56 are secured to each of the channels 51 to obtain an angle 57 parallel to each channel 51. The upper surface of each angle 57 is provided with teeth forming a rack 59. A sliding bracket 60 is mounted on each angle 57 which supports the parallel shafts 61 and 62. The shaft 61 connects the similar opposed brackets 60 and is rigidly connected thereto. The shaft 62 is rotatable and supports pinions 63 which are engageable with the teeth of each rack 59. By rotating the shaft 62 the bracket 60 may be moved forwardly or rearwardly.

Arms 64 are clamped to the fixed shaft 61 and pivotally support pressing arms 65. These pressing arms 65 rest upon the surface of the sheets or blanks riding along the conveyor, tending to hold these blanks in place and assist in properly positioning the sheets or blanks on the conveyor.

Each of the channels 51 is provided with a forwardly extending bar or strip 66 on the forward end thereof. This bar 66 supports the slidable section 50 of the conveyor. As best illustrated in Figure 6 of the drawings, the bar or strips 66 are provided with pairs of rollers 67 and 69 which extend inwardly from the frame strips 66. The frame member 50 is provided with a pair of opposed parallel channels 70 which slidably engage between the pairs of rollers 67 and 69 and are slidably supported thereby.

The frame section 50 includes the parallel opposed side channels 70 which are connected at one end by the transverse cross member 71, and are connected near their opposite ends by the transverse connecting cross member 72. The cross member 72 is spaced from the extreme ends of the frame so as to permit the forward conveyor roller 73 to be mounted at the extreme end of the frame.

From the foregoing description it will be noted that the conveyor frame includes a pair of cross braced parallel channels having parallel side pairs extending forwardly therefrom. A rectangular sliding frame is supported between these pairs by rollers which engage above and below the sliding frame. The frame sections are connected by means which will now be described for permitting movement therebetween.

The slidable frame 50 is provided with a toothed rack 74 secured to each of the side members 70. Each toothed rack is engaged by a pinion 75 mounted for rotation with a transverse shaft 76. The shaft 76 is supported by the frame members 66 of the pivoted frame section 49. Thus rotation of the shaft 76 acts to elongate or shorten the total length of the conveyor frame 47.

With reference now to Figure 5 of the drawings, it will be noted that the shaft 76 may be operated by a hand wheel 77 mounted upon an elongated hub 79 and keyed to the shaft 76 at 80. The hub 79 and its hand wheel 77 are axially slidable on the shaft 76, outward movement of the hand wheel being limited by the collar 81 secured to the end of the shaft. The inner end of the hub 79 is equipped with clutch teeth 82 which cooperate with the interengaging clutch teeth 83 mounted upon the hub 84 of the gear or pinion 85. The gear 85 is supported in a rectangular slide frame 86. The slide frame 86 is slidably supported between parallel guides 87 and 89 connected to a link 90. The guide 87 is a smooth guide and the adjoining surface of the slide frame 86 is grooved at 91 to embrace the inner edge of this guide. The guide 89, as best illustrated in Figure 6, is provided with rack teeth 92 which engage the gear or pinion 85.

Thus it will be seen that movement of the link 90 will act to move the slide 86 relative to the guides 87 and 89, this slidable movement pivoting the gear 85 upon the shaft 86. The guides 87 and 89 are connected together by a gusset plate 93 at the link connected end thereof and by a connecting brace 94 at the free ends of the guides.

The previous description indicates that the movable frame 50 may be moved longitudinally relative to the pivoting frame 49 either by manual manipulation of the hand wheel 77 when the clutch teeth 82 and 83 are disengaged or by movement of the link 90 when the clutch teeth 82 and 83 are engaged as in Figure 5. The link 90 is actuated by pivotal movement of the conveyor frame 47 about its axis 42 in the manner which will now be described in detail.

A lever 95 is pivotally connected to the main frame member 21 at 96. This lever 95 is connected at 97 to the link 90 and pivotally connected at 99 to a second link 100. The link 100 is pivotally connected to the side member 51 of the frame 49 at 101. The elevating of the conveyor frame 47 thus moves the pivoted bell crank lever 95 in a clockwise direction, exerting a pull upon the link 90 and acting to rotate the pinion 85.

With the clutch teeth 82, 83 engaged, this pivotal movement rotates the shaft 76 tending to elongate the conveyor frame 47. Similarly as the conveyor frame 47 pivots down toward the position illustrated the link 100 turns the bell crank lever 95 in a counterclockwise direction, thus exerting a pushing force on the link 90 and tending to retract or shorten the conveyor frame 47. As the conveyor frame approaches horizontal position, little pivotal movement of the bell crank lever 95 takes place. However, as the conveyor frame 47 inclines upwardly the linkage thus described acts more effectively.

As illustrated in Figures 1, 2, and 6 of the drawings, a pair of uprights 102 extend upwardly from the frame strips 66 and these uprights are connected by a transversely extending angle 103. This cross member 103 tends to hold the forward ends of the frame strips in proper spaced relation. A cable 104 is connected at 105 to each of the uprights 102. These cables 104 extend over the pulleys 106 mounted on a shaft 107 and are terminally connected to the counterweights 108 which are vertically slidable between the opposed channels 26 and 27 of the upright frames 25. The shaft 107 is supported by bearings 109 and 110 at each end of the shaft. The bearing 109 is mounted upon a platform 111 secured to the cross members 34 connecting the upper ends of the rectangular frames 25. The bearing 110 is mounted on a second platform 112 also supported by the cross members 34. A motor 113 is mounted on the platform 112 and is connected by a chain 114 to a sprocket 115 on the shaft 107. Movement of the motor 113 therefore causes rotation of the shaft 107 rotating the pulleys 106 and raising or lowering the forward end of the conveyor frame 47.

The motor 113 is of the reversible type so that the pulleys 106 may be rotated in either direction. The motor is also provided with a brake mechanism not illustrated which holds the motor from rotation almost immediately upon the braking of the electrical circuit thereto. The motor 113 is controlled by push button switches mounted conveniently to the operator. By momentarily pushing one button the delivery end of the conveyor may be raised while by pushing a second button the conveyor end may be lowered.

The conveyor itself comprises a series of endless belts which pass over four pulley rollers. The first of these pulley rollers indicated by the number 44 has been described and comprises the drive roller being located at the receiving end of the conveyor. The second conveyor roller 73 has also been described as being mounted at the delivery end of the conveyor frame. The roller 73 is journaled in sliding frames 116 which may move longitudinally of the side members 70 of the frame section 50. Movement of the slide frames 116 is controlled by parallel threaded shafts 117 and 119 which extend through threaded apertures in the sliding frames 116. By rotation of the shafts 117 and 119 which extend through threaded apertures in the sliding frames, the roller 73 may be moved forwardly or rearwardly to tighten the various conveyor belts.

The shaft 117 is provided with a beveled gear 120 which is in mesh with a cooperating bevel gear 121 on a transverse shaft 122 extending between the side members 70 of the frame section 50. The shaft 119 is likewise provided with a bevel gear 123 which is in mesh with a cooperable bevel gear 124 on the shaft 122. By rotation of the shaft 122, both of the shafts 117 and 119 may be rotated in unison, thus advancing both ends of the roller 73 equally.

The conveyor belts also pass over the belt roller 125 which is secured to the rear end of the frame section 50 between the side members 70. The conveyor belts also travel over a belt roller 126 which is supported by the forward ends of the frame strips 66. In sequence the belt passes over the rollers 44 and 73, extends around and under the roller 73 and over the roller 125, extends around and under the roller 125 and over the roller 126 and then extends around and under the roller 126 and about the roller 44. The rollers 125 and 126 are idle rollers and are provided for the purpose of permitting the elongating and shortening of the conveyor during the operation thereof without changing the links of the conveyor belts 127.

As the rollers 44 and 126 are mounted upon the pivoting frame section 49 and as the rollers 125 and 73 are mounted upon the slidable frame section 50, the distance between the rollers 125 and 126 increases the same amount that the distance between the rollers 44 and 73 decreases in shortening the conveyor. When the conveyor is elongated from the position shown in Figure 4 to the position shown in Figure 3, the distance between the rollers 126 and 125 decreases the same amount the distance between the rollers 44 and 73 increases, thus providing an extensible and contractable conveyor employing endless belts.

It is sometimes necessary to halt the material on the conveyor, particularly during the lowering of the delivery end of the conveyor to start a new stack of material. In order to accomplish this result I provide a series of slats which are positioned between adjacent spaced belts 127 and which rest loosely upon the cross member 71. These slats are normally in the position shown in Figure 4 of the drawings and are thus below the level of the conveyor belts 127, the forward ends of the slats resting upon the cross member 72. A bearing bracket 130 is connected to the undersurface of each slat 129 at the forward end thereof, these brackets 130 being pivotally connected to links 131. The links 131 are pivotally connected at 132 to arms 133 secured to a transversely extending shaft 134 supported by the side members 70 of the frame 50. A handle 135 is also secured to the shaft 134 for rotating the same.

The links 131 and 133 provide a toggle lever arrangement which permits the forward ends of the slats 129 to be elevated above the level of the belts 127. Stops 136 on the arms 133 limit the relative pivotal movement of the toggle arrangement slightly past dead center. Thus by operation of the handle lever 135 in a counterclockwise direction from the position shown in Figure 4, the forward ends of the slats 129 may be elevated from a platform onto which the blanks B may accumulate. As soon as the lever 135 is swung back past dead center from the position shown in Figure 3, the slats 129 will again drop into position below the level of the conveyor belt.

In addition to the belt rollers 44 and 73, 125 and 126 which have been described spaced supporting rollers may be provided for supporting the belt at spaced intervals. Such idle rollers are indicated by the numerals 137, 139, and 140. Additional idle rollers may be provided for supporting the load if desired.

Having now described the construction of my stacking conveyor, I will now describe the operation thereof. The main frame 21 and its connecting vertical frame 25 are properly positioned so that the gear 45 meshes with the drive gear 46. The main frame and the conveyor frame are now in readiness for operation.

The conveyor frame 47 is pivoted until its delivery end is slightly above the loading platform 141 or other platform on which the blanks B are to be stacked. This may be done by merely pressing the control button to operate the motor 113 to rotate the pulleys 106. Rotation of the pulleys 106 acts to raise the counterweights 108 and to lower the delivery end of the conveyor frame 47.

The frame 47 may next be adjusted to the proper length to deliver the blanks upon the loading platform. This length is somewhat short of the extreme length of the conveyor so that the conveyor frame may be allowed to elongate as the delivery end thereof raises. The adjustment of the length of the conveyor is made while the clutch teeth 82 and 83 are disengaged. These teeth may next be engaged and the conveyor is in readiness for operation.

The blanks are carried over the top of the conveyor upon the belts 27, these blanks dropping from the end of the conveyor, onto the platform 141. As the stack of blanks increases in height the delivery end of the conveyor is slowly elevated in steps which usually comprise a few inches at a time. Elevation of the free end of the conveyor frame is accomplished by momentarily depressing the proper control switch button to actuate the motor 113 in the proper direction to lower the counterweight 108 and to elevate the conveyor frame.

As the frame 47 pivots upwardly the bell crank lever 95 is rotated in a clockwise direction, exerting a pull on the link 90. This causes the teeth of the rack 92 to rotate the pinion 85, this rotatable movement being transmitted through the clutch teeth 82 and 83 and the hand wheel hub 79 to the shaft 76, causing rotation thereof. Rotation of the shaft 76 is a clockwise direction as viewed in Figure 1 of the drawings rotates the pinions 105 in a direction to elongate the frame 47 by sliding the slidable frame section 50 outwardly relative to the pivoted frame section 49.

Near horizontal position of the conveyor, the pivot point 101 connecting the link 100 to the frame 47 is virtually on a line between the pivot 99 and the axis 44. Thus pivotal movement of the frame 47 near horizontal position has little effect upon the length of the conveyor. At this point it will also be seen that the pivot 97 is almost on a line between the pivot 97 and the shaft 76 so that little pull may be exerted upon the link 90 even though the bell crank 95 pivots slightly.

As the frame 47 swings upwardly from horizontal position, however, the bell crank 95 is drawn by the link 100 so that slight pivotal movement of the frame provides an increased longitudinal movement of the link 90. Thus the extension of the frame increases more rapidly as the angularity of the frame out of horizontal position increases. As a result a substantially equal horizontal length between the ends of the conveyor is maintained as the frame pivots upwardly, thus stacking the blanks 5 in a vertical stack.

When the stack is of the proper height the arm 135 is pivoted into the position shown in Figure 3 of the drawings so that the blanks are pushed upon the slats 129. The loading platform 141 may then be removed and replaced and the conveyor may be lowered into starting position by depressing the proper control button and the motor 113. In the event a second stack of blanks is to be piled beside the first stack the hand wheel 77 is pulled out to disengage the clutch teeth 82, 83, and the conveyor is manually shortened an amount equal to the width of the blank. Two or three stacks of blanks may be piled upon a single loading platform by this means. When the conveyor is in proper position to start a new stack the arm 135 is swung into the position shown in Figure 4 of the drawings and the blanks on the conveyor are carried and deposited into a pile.

In accordance with the patent statutes, I have described the principles of construction and operation of my stacking conveyor and while I have endeavored to set forth the best embodiment thereof, I desire to have it understood that obvious changes may be made within the scope of the following claims without departing from the spirit of my invention.

I claim:

1. A stacking conveyor comprising a two part telescoping extensible frame, an extensible conveyor supported by said frame, horizontal pivot means pivotally supporting one part of said frame adjacent one end thereof to permit the other end of the frame and conveyor to be raised and lowered, automatically operable means supported by the other end of said one frame part operable by the upward pivotal movement of the frame to move the other frame part relative to said one frame part to increase the length of the conveyor to maintain an equal horizontal distance between the conveyor ends, and means independent of said automatically operable means for extending or decreasing the horizontal length between the conveyor ends.

2. A stacking conveyor comprising an elongated extensible frame including two telescoping frame members, an extensible conveyor supported by said frame, means pivotally supporting one member of said frame adjacent one end thereof, means connected to said one frame member for manually adjusting the other frame member relative to said one frame member to vary the horizontal distance between the ends of said frame and conveyor, and independent means actuated by pivotal movement of said frame to automatically adjust the length of the frame to maintain the equal horizontal distance between the ends of the conveyor as the frame pivots.

3. A stacking conveyor comprising an extensible frame comprising two telescoping frame sections, a rack on one of said sections, a pinion supported by the other section engageable with said rack to extend or shorten the frame, means pivotally supporting one end of said frame, an extensible conveyor supported by said frame, automatically operable means actuated by the pivotal movement of said frame to operate said pinion to change the length of said frame and conveyor and independently operable means for manually operating said pinion to vary the horizontal distance between the ends of the frame sections and conveyor.

4. A stacking conveyor comprising an elongated frame comprising two telescoping sections, a rack on one of said sections, a pinion supported by the other of said sections engageable with said rack to extend or shorten said frame, manually operable means for actuating said pinion to change the horizontal distance between the ends of the frame sections, means pivotally supporting said frame adjacent one end thereof, means actuated by the pivotal movement of said frame for actuating said pinion to automatically maintain the ends of the frame sections a constant horizontal distance apart, and clutch means selectively connecting said manually operated pinion actuating means on said last named pinion actuating means.

5. A stacking conveyor comprising an elongated extensible frame including two telescoping frame members, an extensible conveyor supported thereby, means pivotally supporting one member of said frame adjacent one end thereof, lever means pivotally fixed, and link means connected to said lever means and to said one frame member, frame extending means supported by said one frame member, and means connecting said lever and extending means and operable by pivotal movement of said frame to vary the length thereof to maintain the ends of the frame a constant horizontal distance apart, and independent means manually operable to vary the horizontal length of the frame.

6. A stacking conveyor comprising a pair of overlapping frame members designed for relative longitudinal movement to extend or contract the total length of the two frames, an extensible conveyor supported by said frames and extensible and contractable therewith, horizontal pivot means supporting one end of one of said frame members, a rack supported by the other of said frame members, a pinion supported by the other end of said one frame member and engageable with said rack, rotation of said pinion extending and contracting the frame by moving the other frame member relative to said one frame member, and means for rotating said pinion, said means rotating said pinion as the other end of said one frame member is elevated to maintain the conveyor at a substantially constant horizontal length, and independently operable means for manually varying the horizontal length of the conveyor.

7. The structure described in claim 6 in which the means for rotating the pinion includes a second pinion rotatable with said first pinion, and a second rack engageable with said second pinion, said second rack acting to rotate said second pinion as the other end of said one frame member moves upwardly.

8. The structure described in claim 6 in which the means for rotating said pinion includes a second pinion rotatable with the first pinion and a second rack engageable with said second pinion for rotating the same, a link connected to said second rack, and means for moving said second rack to rotate said second pinion as the said other end of said one frame member moves upwardly.

9. The structure described in claim 6 in which the means for rotating said pinion includes a second pinion rotatable with the first pinion, a second rack engaging said second pinion for rotating the same, a link connected to said second rack, a lever pivotally supported upon a fixed pivot and pivotally engaged to said link, and means for pivoting said lever upon upward movement of said other end of said one frame member to move said second rack and rotate said second pinion.

10. The structure described in claim 6 in which the means for rotating the pinion includes a second pinion secured for rotation with said first pinion, a second rack engaged with said second pinion for actuating the same, a link connected to said second rack, a lever pivoted on a fixed pivot and pivotally connected to said link, a second link pivotally connected to said lever and to said one frame member intermediate the ends thereof, upward pivotal movement of said one frame member acting through said second link to pivot said lever and to move said rack to extend the frame.

11. The structure described in claim 6 in which the means for rotating the pinion includes a pinion shaft on which the pinion is mounted, said independently operable means including a hand wheel mounted upon said shaft for rotation therewith, a second pinion rotatably mounted upon said shaft and engageable with said hand wheel for rotation therewith, said hand wheel being slidably mounted on said shaft for disengagement with said second pinion, a second rack engaged with said second pinion for rotating the same, and means actuated by upward pivotal movement of said one frame member to move said second rack and to operate said second pinion.

12. A stacking conveyor comprising an elongated frame including a pair of telescoping frame members, an extensible conveyor carried by said frame and extensible therewith, means pivotally supporting one end of one of said frame members, the other end of the frame being movable upwardly and downwardly about said pivot means, a transversely extending shaft supported by the other end of said one frame member, pinion means on said shaft, rack means on the other of said frame members engaged with said pinion means, a hand wheel slidably supported on said shaft and keyed thereto for rotation therewith, a second pinion rotatably supported upon said shaft, a second rack engaging said pinion for actuating the same, and interengaging means on said hand wheel and said second pinion to selectively secure said second pinion for rotation with said shaft, said second rack being supported to rotate said second pinion as said frame pivots about said pivot means to maintain the horizontal distance between the ends of the frame members and conveyor substantially constant, said hand wheel being independently manually operable to vary said horizontal distance.

13. The structure described in claim 12 in which the pinion means comprises two spaced pinions and the rack means comprises two spaced racks on opposite sides of said other frame member.

NELS H. SANDBERG.

REFERENCES CITED

The following references are of record in the file of this patent:

UNITED STATES PATENTS

| Number | Name | Date |
| --- | --- | --- |
| 733,385 | Goldsmith et al. | July 14, 1903 |
| 1,041,439 | Dearborn | Oct. 15, 1912 |
| 1,141,277 | Smith | June 1, 1915 |
| 1,557,765 | Nicholas | Oct. 20, 1925 |
| 2,166,447 | Ruppenthal | July 18, 1939 |